United States Patent

Getman et al.

[11] Patent Number: 6,138,507
[45] Date of Patent: Oct. 31, 2000

[54] APPARATUS FOR ESTABLISHING AND/OR MONITORING A PREDETERMINED FILLING LEVEL IN A CONTAINER THROUGH CONTROLLED TRANSDUCER PHASE AND IMPEDANCE

[75] Inventors: Igor Getman; Sergej Lopatin; Volker Dreyer, all of Lörrach, Germany

[73] Assignee: Endress + Hauser GmbH + Co., Maulberg, Germany

[21] Appl. No.: 09/056,204

[22] Filed: Apr. 6, 1998

Related U.S. Application Data

[60] Provisional application No. 60/051,595, Jul. 2, 1997.

[30] Foreign Application Priority Data

Apr. 30, 1997 [EP] European Pat. Off. ............ 97107155

[51] Int. Cl.[7] .................................................. G01F 23/00
[52] U.S. Cl. ..................................... 73/290 V; 73/861.27; 340/621
[58] Field of Search ............................ 73/290 V, 861.27, 73/291; 340/621; 367/908

[56] References Cited

U.S. PATENT DOCUMENTS

| | | | |
|---|---|---|---|
| 3,625,058 | 12/1971 | Endress et al. | 73/290 V |
| 4,540,981 | 9/1985 | Lapetina et al. | 340/618 |
| 4,594,584 | 6/1986 | Pfeiffer et al. | 340/620 |
| 5,625,343 | 4/1997 | Rottmar | 340/620 |
| 5,631,633 | 5/1997 | Dreyer et al. | 340/621 |
| 5,717,383 | 2/1998 | Dreyer et al. | 340/621 |
| 5,743,134 | 4/1998 | Dreyer et al. | 73/290 V |
| 5,757,104 | 5/1998 | Getman et al. | 310/317 |
| 5,895,848 | 4/1999 | Wilson et al. | 73/290 V |
| 5,966,983 | 9/1998 | Pfeiffer et al. | 73/291 |
| 5,969,621 | 10/1999 | Getman et al. | 340/621 |

FOREIGN PATENT DOCUMENTS

| | | |
|---|---|---|
| 63008582 | 1/1988 | European Pat. Off. . |
| 44 02 234 | 4/1995 | Germany . |
| 44 19 617 | 7/1995 | Germany . |
| 44 39 879 | 2/1996 | Germany . |

*Primary Examiner*—Hezron Williams
*Assistant Examiner*—Michael Cygan
*Attorney, Agent, or Firm*—Bose McKinney & Evans LLP

[57] ABSTRACT

An apparatus for establishing and/or monitoring a predetermined filling level in a container is described, in which a fixed phase difference ($\Delta\phi_R$), which is independent of the oscillation quality of the apparatus, exists between a transmission signal and a reception signal (E) at the resonant frequency ($f_r$) of the mechanical oscillatory structure. This apparatus comprises a mechanical oscillatory structure (1), an electromechanical transducer (2) having at least one transmitter (23) and a receiver (24), an evaluation unit (9), which determines the frequency of the reception signal (E), compares it with a reference frequency ($f_R$) and generates an output signal which indicates that the mechanical oscillatory structure (1) is covered by a charge material if the frequency has a value which is less than the reference frequency ($f_R$) and a control loop, which regulates a phase difference existing between the electrical transmission signal and the electrical reception signal (E) to a specific, constant value at which the oscillatory structure (1) oscillates at a resonant frequency ($f_r$). A reception signal line (6), which transmits the reception signal (E), is connected via an electrical impedance (Z) to a transmission signal line (5), which transmits the transmission signal.

6 Claims, 4 Drawing Sheets

APPARATUS FOR ESTABLISHING AND/OR MONITORING A PREDETERMINED FILLING LEVEL IN A CONTAINER THROUGH CONTROLLED TRANSDUCER PHASE AND IMPEDANCE

This application claims the benefit of U.S. Provisional No. 60/051,595 filed Jul. 2, 1997.

The invention relates to an apparatus for establishing and/or monitoring a predetermined filling level in a container, which apparatus comprises:

a mechanical oscillatory structure, which is fitted at the level of the predetermined filling level, an electromechanical transducer,
  which has at least one transmitter,
    to which an electrical transmission signal is applied and
    which excites the mechanical oscillatory structure to produce oscillations, and
  which has a receiver
    which picks up the mechanical oscillations of the oscillatory structure and converts them into an electrical reception signal, an evaluation unit,
  which picks up the reception signal and determines its frequency, compares said frequency with a reference frequency and generates an output signal which indicates that the mechanical oscillatory structure is covered by a charge material if the frequency has a value which is less than the reference frequency, and that it is not covered if the value is greater, and a control loop, which regulates a phase difference existing between the electrical transmission signal and the electrical reception signal to a specific, constant value at which the oscillatory structure oscillates at a resonant frequency.

Filling level limit switches of this type are employed in many branches of industry, in particular in the chemical industry and in the foodstuffs industry. They serve the purpose of limit level detection and are used, for example, as a protection against overfilling or as a safeguard against pumps running dry.

DE-A 44 19 617 describes an apparatus for establishing and/or monitoring a predetermined filling level in a container. This apparatus comprises:

a mechanical oscillatory structure, which is fitted at the level of the predetermined filling level, an electromechanical transducer,
  which has at least one transmitter,
    to which an electrical transmission signal is applied and
    which excites the mechanical oscillatory structure to produce oscillations, and
  which has a receiver
    which picks up the mechanical oscillations of the oscillatory structure and converts them into an electrical reception signal, an evaluation unit,
  which picks up the reception signal and determines its frequency, compares it with a reference frequency and generates an output signal which indicates that the mechanical oscillatory structure is covered by a charge material if the frequency has a value which is less than the reference frequency, and that it is not covered if the value is greater, and a control loop, which regulates a phase difference existing between the electrical transmission signal and the electrical reception signal to a specific, constant value at which the oscillatory structure oscillates at a resonance frequency.

The control loop is formed, for example, in that the reception signal is amplified and fed back to the transmission signal via a phase shifter.

To date, it has not been possible to employ apparatuses of this type additionally for measurements in highly viscous media or in hydrous or viscous foams, since reliable excitation of the mechanical oscillatory structure to produce oscillations at the resonant frequency is not ensured in these applications.

First investigations which led to the invention described below showed that the cause of this lies in the fact that the apparatus described is a complex oscillatory system composed of the mechanical oscillatory structure, the electromechanical transducer and the control loop. The individual components are not completely isolated electrically and separated mechanically from one another. Both electrical and mechanical coupling occurs.

The fixed value of the phase difference corresponds to the resonance of the system when the oscillatory structure oscillates in gases or in liquids. However, if the oscillation quality of the apparatus is reduced for any reason, then the consequence of this is that the fixed value of the phase difference no longer exists. There is no frequency at which the mechanical oscillatory structure executes oscillations having an amplitude different from zero and the phase difference has the fixed value. This phase difference cannot be set by the control loop. Incorrect functioning consequently occurs.

A reduction in the oscillation quality occurs, for example, when the movement of the mechanical oscillatory structure is attenuated, for example by the latter being immersed in a viscous medium or in a liquid-containing or viscous foam. Furthermore, the oscillation quality is reduced by energy losses within the apparatus, for example due to instances of material fatigue or instances of asymmetry, for example on account of asymmetrical deposit formation, which lead to asymmetrical restoring forces. In principle, any type of energy loss, be it oscillation energy released to a charge material or energy released to the container via a fastening of the apparatus, leads to a reduction in the oscillation quality.

One object of the invention is to specify an apparatus of the type mentioned in the introduction, in which a fixed phase difference, which is independent of the oscillation quality of the apparatus, exists between the transmission signal and the reception signal at the resonant frequency of the mechanical oscillatory structure.

This is achieved according to the invention in that a reception signal line, which transmits the reception signal, is connected via an electrical impedance to a transmission signal line which transmits the transmission signal.

In accordance with one embodiment of the invention, the reception signal has three components, namely a measurement signal, which is governed by the oscillation of the mechanical oscillatory structure, a first additional signal, which is governed by electrical coupling between the transmitter and the receiver, and a second additional signal, which is governed by mechanical coupling between the transmitter and the receiver, and in which the impedance is determined in such a way that the first and the second additional signals have virtually identical amplitudes, and have a profile which is virtually in antiphase.

In accordance with a further refinement, the transmitters 23 and the receiver 24 are piezoelectric elements.

In accordance with a further refinement, the phase difference between the transmission signal and the reception signal assumes values between 20° and 90° or between −90° and −20°, referring to a reference value.

In accordance with a further refinement, the impedance is a capacitance.

In accordance with one refinement of the invention, the impedance is a resistance, an inductance or a combination of at least one resistance and/or at least one inductance and/or at least one capacitance.

The invention and further advantages will now be explained in more detail with reference to the figures of the drawing, in which figures an exemplary embodiment is illustrated; identical elements are provided with identical reference symbols in the figures.

Figure 1:
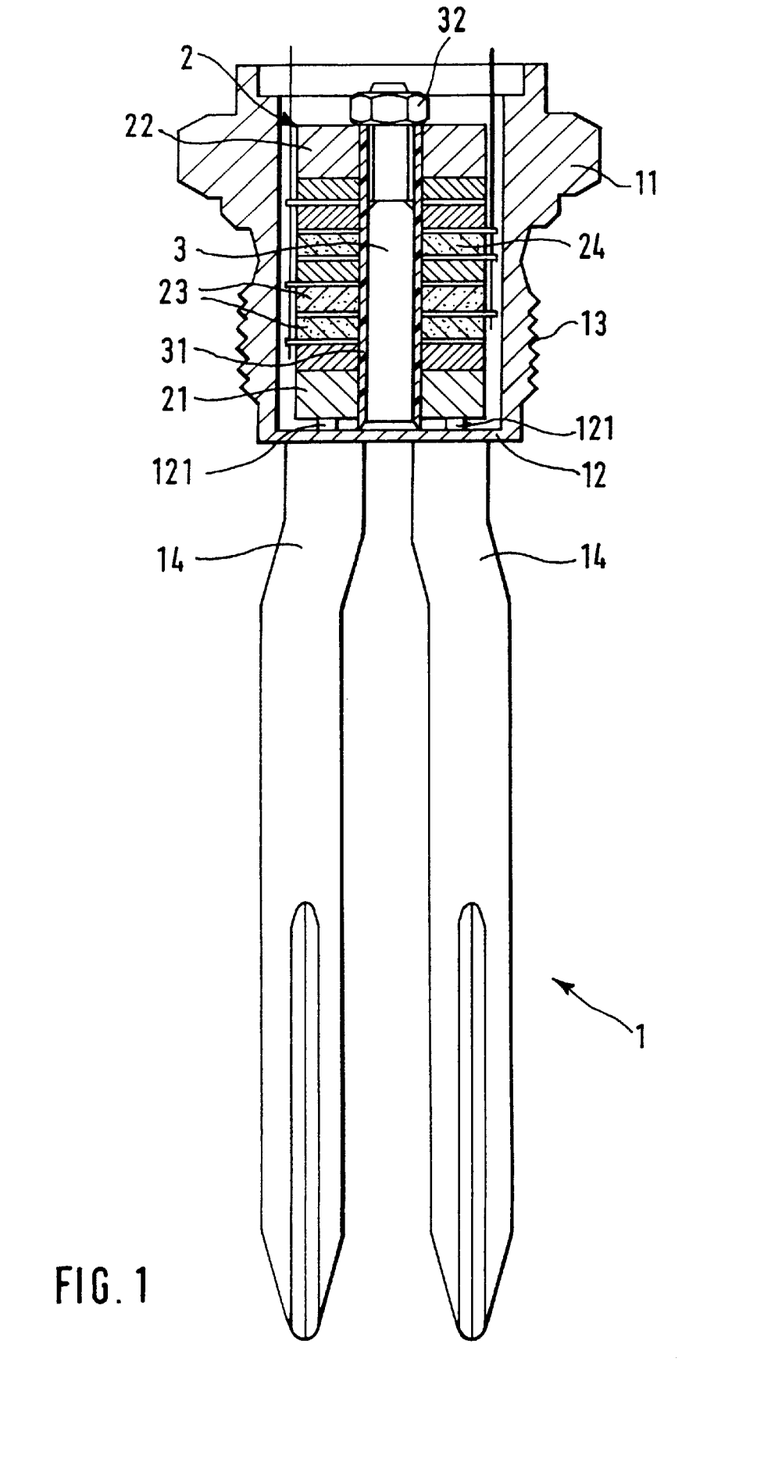
FIG. 1 shows a longitudinal section through a mechanical oscillatory structure and an electromechanical transducer.

FIG. 1 shows a longitudinal section through an exemplary embodiment of a mechanical oscillatory structure 1. It has an essentially cylindrical housing 11, which is closed off flush at the front by a circular diaphragm 12. A thread 13 is integrally formed on the housing 11, by means of which thread the apparatus can be screwed into an opening (not illustrated), which is arranged at the level of the predetermined filling level, in a container. Other fastening methods which are known to a person skilled in the art, for example by means of flanges integrally formed on the housing 11, can likewise be employed.

Two oscillating bars 14 which point into the container are integrally formed on the diaphragm 12 on the outside of the housing 11. These bars are caused to oscillate perpendicularly to their longitudinal axis by means of an electromechanical transducer 2 arranged in the interior of the housing 11.

However, the invention is not restricted to mechanical oscillatory systems having two oscillating bars; it can also be employed in limit switches which have only one or no oscillating bars. In the cases mentioned last, for example only the oscillating diaphragm comes into contact with a charge material situated in the container.

The transducer 2 has three annular piezoelectric elements arranged in a stack. A respective metal ring 21, 22 is arranged at both ends of the stack. The metal ring 21 facing the diaphragm bears on pressure pins 121, which are integrally formed on an outer annular surface of the diaphragm 12. A tensioning bolt 3 pointing into the interior of the housing 11 is provided in the center of the diaphragm 12. This bolt is provided with insulation 31 and passes through the transducer 2. A nut 32 is screwed onto that end of the tensioning bolt 3 which is remote from the diaphragm. This nut bears on the metal ring 22 remote from the diaphragm. The nut 32 is tightened. The diaphragm 12 is thus pretensioned.

Figure 2:
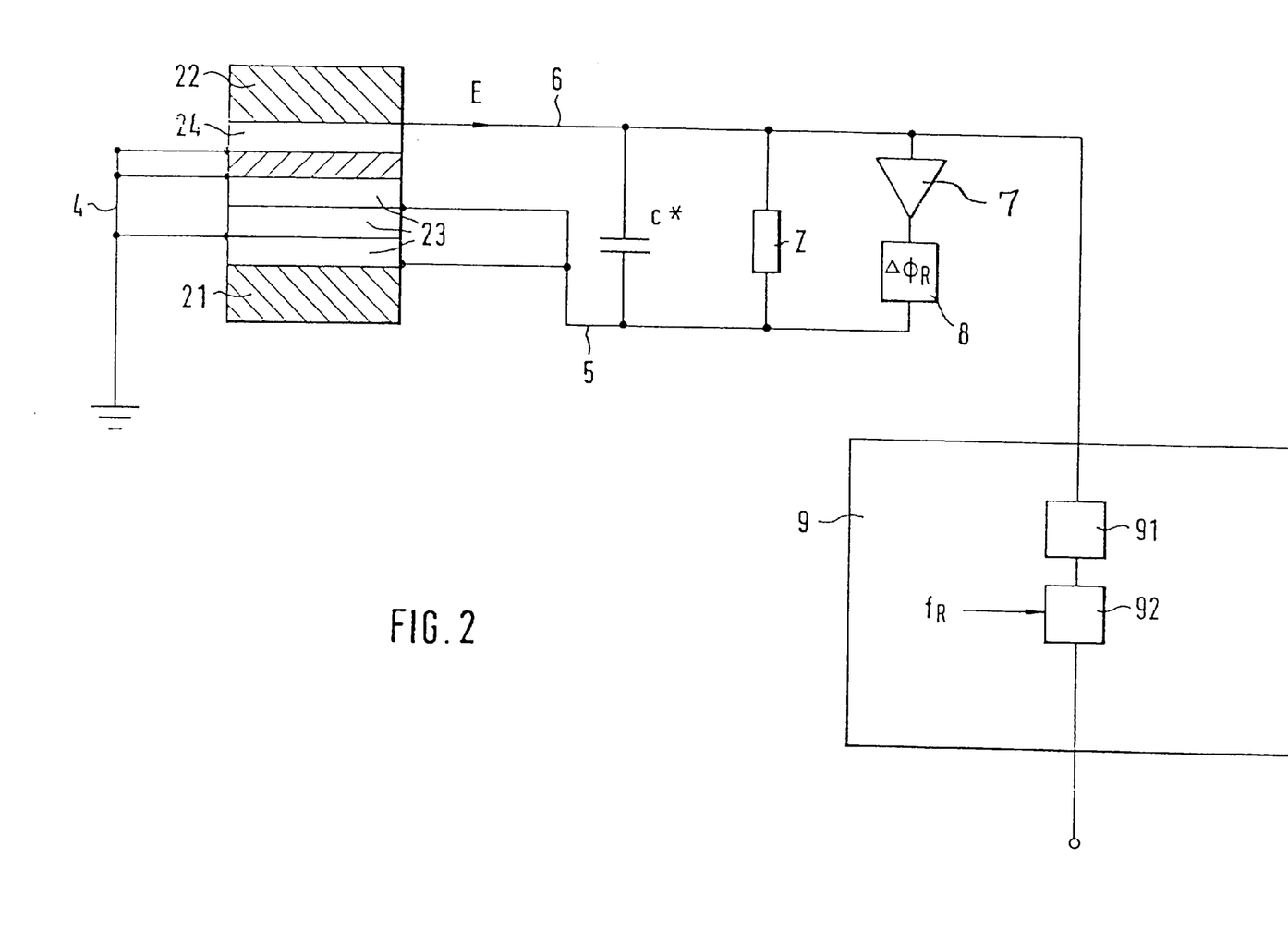
FIG. 2 shows a diagrammatic illustration of the transducer of FIG. 1 and a circuit connected thereto.

The two piezoelectric elements facing the diaphragm operate as transmitters 23 and the piezoelectric element remote from the diaphragm serves as a receiver 24. FIG. 2 shows a diagrammatic illustration of the transducer 2 and an electrical circuit connected thereto. Each of the transmitters 23 and the receiver 24 has two electrodes which are in each case arranged on their annular surfaces and of which a respective first electrode is connected via a line 4 in each case to a reference potential, for example ground. The respective second electrode of the transmitters 23 is in each case connected to a transmission signal line 5. The second electrode of the receiver 24 is connected to a reception signal line 6.

The piezoelectric elements, that is to say the transmitters 23 and the receiver 24, are in each case polarized parallel to the longitudinal axis of the stack. If an AC voltage is present on the transmission signal line 5, then the transmitters 23 execute thickness oscillations. The height of the stack oscillates correspondingly. Since the stack is clamped in by the tensioning bolt 3, the nut 32 and the pressure pins 121 and is coupled to the diaphragm 12, the diaphragm 12 is excited by these thickness oscillations to produce flexural vibrations. The oscillating bars 14 are fixedly connected to the diaphragm 12 at their ends. Flexural vibrations of the diaphragm 12 consequently cause the oscillating bars 14 to oscillate perpendicularly to their longitudinal axis.

An oscillation of the oscillating bars 14 correspondingly leads to a flexural vibration of the diaphragm 12, which in turn effects a thickness oscillation of the stack. This thickness oscillation leads to a change in the voltage drop across the receiver 24. A corresponding reception signal E is available via the reception signal line 6.

The amplitude A of this electrical reception signal E is larger, the larger the mechanical oscillation amplitude of the oscillating bars 14 is. To exploit this fact, the apparatus is preferably operated at its resonant frequency $f_r$. The mechanical oscillation amplitude is a maximum at the resonant frequency $f_r$.

If a harmonic oscillator is considered as an example of an ideal oscillatory system, then its oscillation amplitude has a single maximum as a function of the oscillation frequency. The phase difference between the oscillation excitation and the oscillation of the oscillator experiences a sudden phase change of 180° in the region of this maximum. At the resonant frequency, the oscillation amplitude is a maximum and the phase difference is 90°.

Based on the same fundamental physical principle, a fixed phase relationship between the transmission signal and the reception signal E exists in the case of resonance in the present apparatus, too. The fixed value of this phase difference is dependent on the polarization of the transmitters 23 and of the receiver 24 and on the mechanical and electrical oscillation properties of the apparatus. Measurements have shown that the values lie, as a rule, between 20° and 90° or between −90° and −20°, referring to a reference point, for example 0° or 180°.

In order that the mechanical oscillatory structure is made to oscillate at its resonant frequency $f_r$, a control loop is provided, which regulates the phase difference existing between the electrical transmission signal and the electrical reception signal E to a specific, constant value $\Delta\phi_R$. An exemplary embodiment of a control loop of this type is illustrated in FIG. 2. In that case, the reception signal E is fed back to the transmission signal via an amplifier 7 and a phase shifter 8, which shifts its phase by the specific, constant value $\Delta\phi_R$. The amplifier 7 should be dimensioned such that the self-excitation condition is satisfied. The mechanical oscillatory structure is consequently excited by means of the transducer 2 to produce oscillations at its resonant frequency. If the oscillatory structure is covered by the charge material, then the resonant frequency $f_r$ has a lower value than if the oscillatory structure oscillates freely. The fixed value of the phase difference, which is assumed at the resonant frequency $f_r$, is, on the other hand, independent of whether or not the oscillatory structure is covered by the charge material.

The reception signal E is applied via the reception signal line 6 to the input of an evaluation unit 9. Its frequency is determined by means of a frequency-measuring circuit 91 and the result is fed to a comparator 92. The latter compares the measured frequency with a reference frequency $f_R$ stored in a memory. If the measured frequency is less than the reference frequency $f_R$, the evaluation unit 9 emits an output signal which indicates that the mechanical oscillatory structure is covered by a charge material. If the frequency has a value which is greater than the reference frequency $f_R$, then the evaluation unit 9 emits an output signal which indicates that the mechanical oscillatory structure is not covered by the charge material. The output signal is, for example, a voltage which assumes a corresponding value or a current which has a corresponding value or on which a signal current in the form of pulses having a corresponding frequency or a corresponding duration is superposed.

In a harmonic oscillator, attenuation or reduction of the oscillation quality effects a reduction in the maximum amplitude in the case of resonance. In such a case, the phase increase as a function of the frequency proceeds continuously rather than abruptly, to be precise it proceeds more slowly, the greater the attenuation or the reduction of the oscillation quality is. Overall, however, even with very great attenuation, a phase change of a total of 180° ensues and a phase difference of 90° exists at the resonant frequency. The fixed value, corresponding to resonance, of the phase difference of 90° always exists and is assumed at the resonant frequency.

In contrast to an ideal oscillator, in the abovementioned apparatus, couplings of an electrical and mechanical nature exist between the transmitters 23, the receiver 24 and the mechanical oscillatory structure. The mechanical coupling is essentially governed by the mechanical clamping-in of the transducer 2. Thus, for example, a transmission signal exciting the transmitter 23 leads to a reception signal E even when the oscillating bars 14 are restrained and are consequently not moving.

The electrical coupling exists between the transmitters 23 and the receiver 24. These are not electrically independent of one another, rather there exists a, as a rule capacitive, connection between them. This connection is illustrated in FIG. 2, in the form of an equivalent circuit diagram, by the capacitance C* which is inserted between the transmission signal line 5 and the reception signal line.

The reception signal E is consequently composed of three components, namely a measurement signal $E_M$, a first additional signal $E_{mech}$ governed by the mechanical coupling, and a second additional signal $E_{el}$ governed by the electrical coupling.

$$E = E_M + E_{mech} + E_{el}$$

The measurement signal $E_M$ is based on the oscillation of the mechanical oscillatory structure and has a frequency-dependent amplitude $A_M(f)$ and a frequency-dependent phase $\Delta\phi_M(f)$. Phase in each case denotes the phase offset of the respective component of the electrical reception signal E with reference to the electrical transmission signal.

Figure 3A:
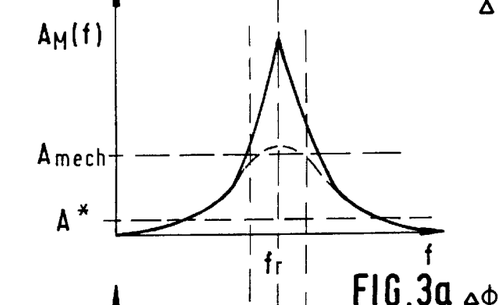
FIG. 3a shows the amplitude of the measurement signal as a function of the frequency for a high and for a low oscillation quality.
Figure 3B:
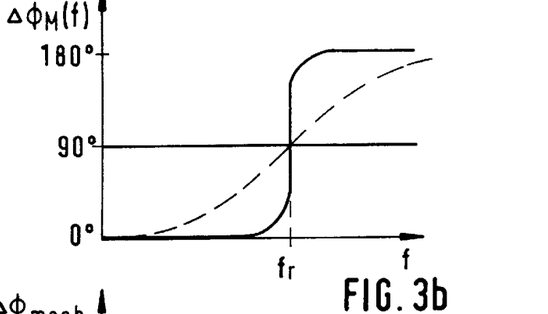
FIG. 3b shows the phase of the measurement signal as a function of the frequency for a high and for a low oscillation quality.

FIG. 3a shows the amplitude $A_M(f)$ and FIG. 3b the phase $\Delta\phi_M(f)$ of the measurement signal $E_M$ as a function of the frequency f. The curves can be determined computationally by simulation calculations, for example by finite element calculations.

They can be measured experimentally by connecting the transmission signal line 5 to a frequency generator and by determining the phase and amplitude of the oscillation of the oscillating bars 14 as a function of the frequency of the frequency generator, using a laser vibrometer, for example.

In each of the two figures, the continuous line corresponds to an apparatus having a high oscillation quality and the dashed line corresponds to an apparatus having a low oscillation quality. In both cases, both the amplitude $A_M(f)$ and the phase $\Delta\phi_M(F)$ of the measurement signal have the profile which is typical of a harmonic oscillator and has already been described above.

The two additional signals $E_{mech}$, $E_{el}$ each have an essentially constant amplitude $A_{mech}$, $A_{el}$ and an essentially constant phase $\Delta\phi_{mech}$, $\Delta\phi_{el}$. In this case, too, phase denotes the phase offset of the respective component of the electrical reception signal E with reference to the electrical transmission signal.

Figure 4A:
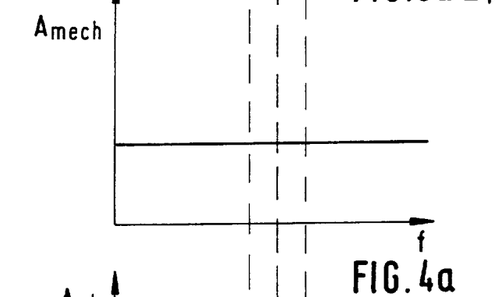
FIG. 4a shows the amplitude of a first additional signal as a function of the frequency.
Figure 4B:
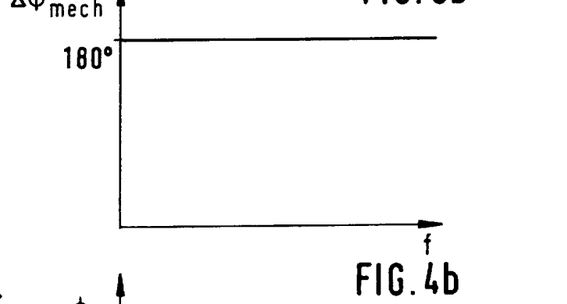
FIG. 4b shows the phase of the first additional signal as a function of the frequency.

FIG. 4a shows the amplitude $A_{mech}$ and FIG. 4b the phase $\Delta\phi_{mech}$ of the first additional signal $E_{mech}$ as a function of the frequency f. The curves can be determined computationally by simulation calculations, for example by finite element calculations. They can be measured experimentally when the other two signal components, namely the measurement signal $E_M$ and the second additional signal $E_{el}$, are suppressed. If their amplitudes have a value of almost zero, then the reception signal E is equal to the first additional signal $E_{mech}$ and can be measured by means of an oscilloscope, for example.

The measurement signal $E_M$ can be eliminated by restraining the oscillating bars 14 such that they are mechanically fixed. The second additional signal $E_{el}$ can be avoided by electrical insulation of the receiver 24, for example in the form of a grounded metallic shield. It is also recommendable, if possible, to use short lines, in order to keep down the coupling in of electrical signals of any type.

Figure 5A:
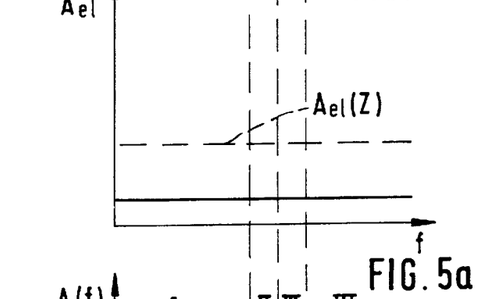
FIG. 5a shows the amplitude of a second additional signal as a function of the frequency with and without additional electrical coupling.
Figure 5B:
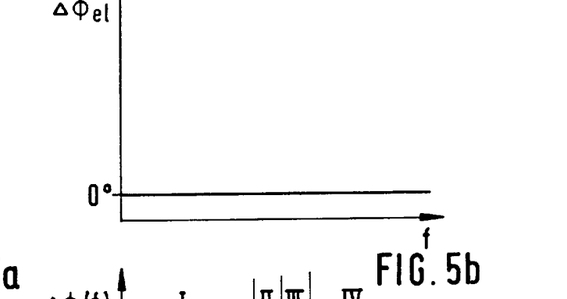
FIG. 5b shows the phase of the second additional signal as a function of the frequency.

The continuous line in FIG. 5a shows the amplitude $A_{el}$ and the continuous line in FIG. 5b the phase $\Delta\phi_{el}$ of the second additional signal $E_{el}$ as a function of the frequency f. These curves, too, can be determined by simulation calculations. They can be recorded experimentally by, for example, employing non-polarized piezoelectric elements as transmitters 23 and as receiver 24. In these, no mechanical motion at all is generated by a transmission signal, and the reception signal E consequently corresponds to the second additional signal $E_{el}$ based on electrical coupling. The latter signal can likewise be measured by means of an oscilloscope.

The amplitudes $A_{mech}$, $A_{el}$ and the phases $\Delta\phi_{mech}$, $\Delta\phi_{el}$ of the additional signals $E_{mech}$, $E_{el}$ are virtually frequency-independent and are unambiguously related to the mechanical structure of the respective apparatus and to the electrical and mechanical properties of the transmitters 23 and of the receivers 24. The amplitude $A_{mech}$ is typically substantially greater than the amplitude $A_{el}$. The phases $\Delta\phi_{mech}$, $\Delta\phi_{el}$, are, typically, virtually identical or offset virtually by 180° with respect to one another. The latter case is illustrated in FIG. 4b and FIG. 5b. If these two additional signals have the same phase over the frequency range, then it is necessary either to interchange the terminals of the electrodes of the receiver 24a or to rotate the polarization of the latter through 180°. The latter scenario can be achieved, for example, by rotating the piezoelectric element. As a result, the two additional signals have the desired opposite, that is to say offset by 180° with respect to one another, phase. The same result is, of course, achieved by manipulating the transmitters 23 in a corresponding manner. In practice, the situation may also arise where the phases $\Delta\phi_{mech}$, $\Delta\phi_{el}$ differ by an amount which is distinctly different from 0° or 180°. The following then applies in an analogous manner. In this exemplary embodiment, a difference of 180° is selected since the fundamental relationships can be illustrated more simply and more clearly by doing so.

Figure 6A:
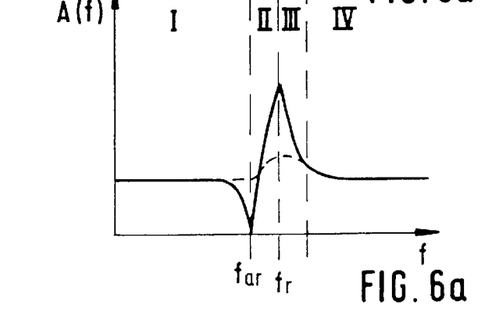
FIG. 6a shows the amplitude of the reception signal as a function of the frequency for a high and for a low oscillation quality.
Figure 6B:
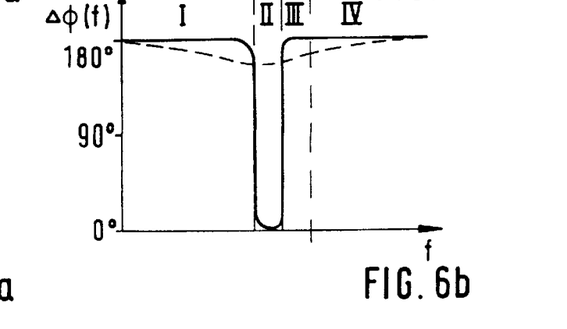
FIG. 6b shows the phase of the reception signal as a function of the frequency for a high and for a low oscillation quality.

FIG. 6a shows the amplitude A(f) and FIG. 6b the phase $\Delta\phi(f)$ of the reception signal E. The two curves result from the phase- and amplitude-accurate superposition of the three above-described components of the reception signal E.

$$E e^{i\Delta\phi} = A_M e^{i\Delta\phi_M} + A_{mech} e^{i\Delta\phi_{mech}} + A_{el} e^{i\Delta\phi_{el}}$$

Both curves each have four regions I, II, III, IV, which are described in a greatly simplified manner below. In a first region I, the first additional signal is predominant, since it has the largest amplitude $A_{mech}$. The phase $\Delta\phi_{mech}$ of this signal differs from the phases $\Delta\phi_M(f)$ amd $\Delta\phi_{el}$ by about 180°. The resulting amplitude A(f) consequently corresponds approximately to the amplitude $A_{mech}(f)$ reduced by the sum of the amplitudes $A_M(f)$ and $A_{el}$.

$$A(f) \approx A_{mech}(f) - (A_M(f) + A_{el})$$

The resulting phase $\Delta\phi(f)$ is 180° in this region I.

In a second region II, the measurement signal $E_M$ assumes the commanding role on account of its increasing amplitude $A_M(f)$, which exceeds the amplitude $A_{mech}$ of the first additional signal. Its phase $\Delta\phi_M(f)$ is 0° in this region II. The amplitude A of the resulting signal consequently corresponds approximately to the sum of the amplitudes of the measurement signal $A_M(f)$ and of the second additional signal $A_{el}(f)$, which sum is reduced by the amplitude $A_{mech}$ of the first additional signal.

$$A(f) \approx A_M(f) + A_{el} - A_{mech}$$

Before the region boundary between region I and region II, the amplitude A(f) of the reception signal E decreases considerably. In this frequency range, the phase $\Delta\phi(f)$ of the reception signal E decreases from 180° to 0°. In the region II, the amplitude A rises and the phase $\Delta\phi(f)$ remains unchanged at 0°. The resonant frequency $f_r$ lies between the region II and a region III. The measurement signal $E_M$ correspondingly has a sudden phase change of 180°. This signal is also predominant in the region III on account of its amplitude $A_M(f)$, which is now decreasing but still exceeds the amplitude $A_{mech}$ of the first additional signal $E_{mech}$. Consequently, in the region III, the amplitude A of the reception signal essentially corresponds to the sum of the amplitudes AM(f) of the measurement signal and of the first additional signal $A_{mech}(f)$, which sum is reduced by the amplitude $A_{el}(f)$ of the second additional signal.

$$A(f) \approx A_M(f) + A_{mech} - A_{el}$$

It decreases with the frequency in accordance with the decrease in the amplitude of the measurement signal $A_M(f)$. The phase is 180° in this region III.

In a region IV, the amplitude of the measurement signal $A_M(f)$ falls below the amplitude of the first additional signal $A_{mech}$. In this region IV, the amplitude A of the reception signal E decreases asymptotically to a final value, which corresponds to the difference between the amplitudes $A_{mech}$ and $A_{el}$ of the two additional signals.

$$A(f) \approx A_{mech} - A_{el}$$

The phase $\Delta\phi(f)$ remains at a value of 180°.

The phase difference between the electrical transmission signal and the electrical reception signal E has, as a function of the frequency, two sudden phase changes each of 180° in opposite directions to one another. There are consequently two frequencies at which the phase $\Delta\phi(f)$ has the fixed value $\Delta\phi_R$ which corresponds to resonance and was described at the beginning, in this case 90°, namely at the region boundary between the region I and the region II and at the region boundary between the region II and the region III. The first frequency, which is referred to as the antiresonant frequency $f_{ar}$ below, is insignificant, since the amplitude of the electrical reception signal E is negligibly small in this case. The frequency-determining element of the control loop is consequently inactive. As a result, the feedback is interrupted and the self-excitation condition cannot be satisfied. The second frequency is the resonant frequency $f_r$ of the system. It is the critical frequency during operation of the apparatus and is set automatically by the control loop.

It goes without saying that the values of the phases $\Delta\phi$, $\Delta\phi_{mech}$, $\Delta\phi_{el}$ of the individual signals $E_M$, $E_{mech}$, $E_{el}$ are different for different apparatuses, but their fundamental profile applies to all of the apparatuses mentioned and can be comprehended with reference to the description of the exemplary embodiment.

If the situation now arises where the mechanical oscillatory structure is damped or has a reduced oscillation quality, then the amplitude $A_M(f)$ and phase $\Delta\phi_M(f)$ of the measurement signal exhibit the profile illustrated by dashed lines in FIGS. 3a and 3b. The amplitude $A_M(f)$ rises and falls considerably more slowly with the frequency and has a distinctly lower maximum value. The phase $\Delta\phi_M(f)$ does not exhibit a sudden phase change, but rather rises continuously with the frequency. The greater the reduction in the oscillation quality of the system is, the lower the maximum value of the amplitude is and the lower the gradient of the phase is. However, the phase $\Delta\phi_M(f)$ always reaches the values 0° and 180° asymptotically and it is still 90° at the resonant frequency. The additional signals $E_{mech}$ and $E_{el}$ remain unchanged.

The amplitude A(f) and phase $\Delta\phi(f)$ of the reception signal E resulting from the amplitude- and phase-accurate superposition of the three components clearly differ from the example mentioned first, in which there was no reduction in the oscillation quality. The maxima of the amplitude A(f) are a great deal less pronounced and the phase $\Delta\phi(f)$ has two continuous phase changes in opposite directions to one another instead of the two sudden phase changes each of 180° in opposite directions to one another. The maximum phase difference is clearly less than 180°. Depending on the oscillation quality of the system, it is even less than 90°.

If, therefore, damping of the mechanical oscillatory structure, for example in foam or in a viscous medium, or a different type of reduction in the oscillation quality of the system, for example caused by loosening of the mechanical connection between the piezoelectric elements operating as transmitters 23 or as receiver 24 and the mechanical oscillatory structure, occurs, then the phase difference between the electrical transmission signal and the electrical reception signal E admittedly still has, as a function of the frequency, two continuous phase changes in opposite directions to one another, but the maximum phase difference may be very small. The maximum phase difference is smaller, the smaller the interval between the resonant frequency $f_r$ and the antiresonant frequency $f_{ar}$ is.

A fixed phase relationship, corresponding to resonance, between the transmission signal and the reception signal E is established by the control loop, which excites the mechanical oscillatory system to produce oscillations at the resonant frequency $f_r$. In order that the apparatus described is functional in the uncovered state in conjunction with a high oscillation quality, the fixed phase difference $\Delta\phi_R$ is 90° in the exemplary embodiment shown here. It is produced by the phase shifter 8 in the exemplary embodiment shown.

If the previously described situation where the phase $\Delta\phi(f)$ of the reception signal no longer assumes this fixed value $\Delta\phi_R$ over the entire frequency range now occurs on account of the properties of the charge material or on account of a reduction in the oscillation quality, then reliable excitation of the mechanical oscillatory system is no longer possible. The apparatus is consequently not functional.

According to the invention, this problem is solved by connecting the transmission signal line 5 to the reception signal line 6 via an electrical impedance Z. This constitutes an additional electrical coupling. This connection is arranged electrically in parallel with that section of the control loop which comprises the amplifier 7 and the phase shifter 8. The impedance Z is, for example, a resistance, a capacitance, an inductance or a combination of the components mentioned.

The impedance Z has an effect both on the amplitude $A_{el}$ and on the phase $\Delta\phi_{el}$ of the second additional signal. It must be dimensioned such that the amplitude $A_{el}$ of said second additional signal is as far as possible equal to the amplitude $A_{mech}$ of the first additional signal, and that the phase $\Delta\phi_{el}$ of said second additional signal is shifted through 180° with respect to the phase $\Delta\phi_{mech}$. Investigations have shown that in most cases it is sufficient to use a capacitor having a corresponding capacitance, for example a capacitance of a few pico-farads. The value of the capacitance can either be determined in advance by means of model calculations or can be determined by a series of measurements to be carried out using a tunable capacitor.

If the two additional signals $E_{mech}$ and $E_{el}$ have virtually the same phase, then it is necessary either to interchange the terminals of the electrodes of the receiver 24 or to rotate the polarization of the latter through 180°. The latter scenario can be achieved, for example, by rotating the piezoelectric element. As a result, the two additional signals have the desired opposite, that is to say offset by 180° with respect to one another, phase. The same result is, of course, achieved by manipulating the transmitters 23 in a corresponding manner.

As a dashed line in each case, FIG. 5a illustrates the amplitude $A_{el}$ and FIG. 5b the phase $\Delta\phi_{el}$ of the second additional signal $E_{el}$ as a function of the frequency f for the case where the transmission signal line 5 and the reception signal line 6 are connected to one another via a correspondingly dimensioned impedance Z.

In the previously described prior art, the amplitudes $A_{mech}$ and $A_{el}$ of the two additional signals differ to a great extent. The signal having the larger amplitude is consequently predominant in wide frequency ranges. In the apparatus according to the invention, on the other hand, the amplitudes $A_{mech}$ and $A_{el}$ are preferably virtually identical and their phases $\Delta\phi_{mech}$ and $\Delta\phi_{el}$ are preferably virtually opposite. The amplitude- and phase- accurate sum $A_{mech}e^{i\Delta\phi mech} + A_{el}e^{i\Delta\phi el}$ has a critical influence on the reception signal. If the two additional signals have an opposite phase, a difference $A^* = A_{mech} - A_{el}$ between the amplitudes $A_{mech}$, $A_{el}$ of the two signals consequently has an influence. This difference has a very low value in comparison with the individual amplitudes $A_{mech}$ and $A_{el}$ of the additional signals $E_{mech}$, $E_{el}$. The value of $A^*$ is illustrated in FIG. 3a.

Assuming that in this case, too, the amplitude $A_{mech}$ of the first additional signal is slightly larger than the amplitude of the second additional signal, the phase $\Delta\phi_{mech}$ of the first additional signal is critical for the frequencies at which the difference $A^*$, now critical, is greater, in terms of its magnitude, than the amplitude $A_M(f)$ of the measurement signal.

Figures 7A, 7B:
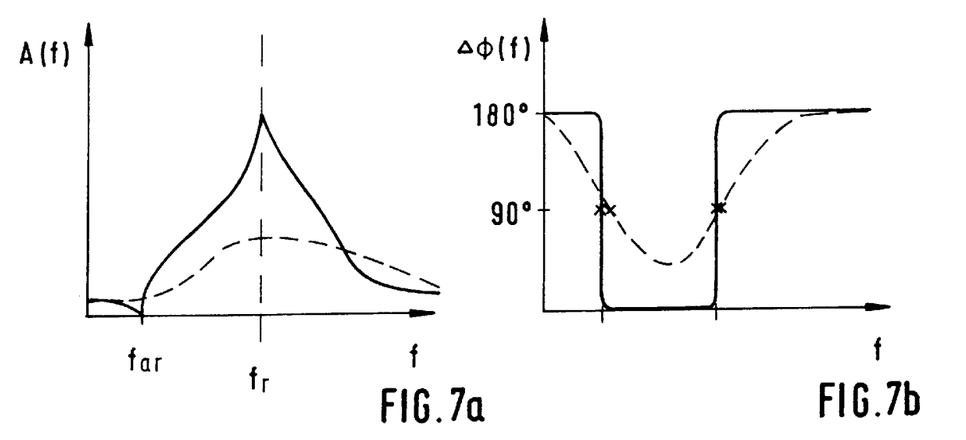
FIG. 7a shows the amplitude of the reception signal as a function of the frequency for a high and for a low oscillation quality with additional electrical coupling.
FIG. 7b shows the phase of the reception signal as a function of the frequency for a high and for a low oscillation quality with additional electrical coupling.

The amplitude $A(f)$ and the phase $\Delta\phi(f)$ of the resulting reception signal E are illustrated in FIGS. 7a and 7b. According to these figures, the amplitude $A(f)$ assumes the value $A^*$ asymptotically. It has a minimum at an antiresonant frequency $f_{ar}$ and a maximum at the resonant frequency $f_r$. In comparison with the profile illustrated in FIG. 6a, the minimum is a good deal less pronounced and the difference between the resonant frequency and the antiresonant frequency is distinctly greater. As shown by the dashed line, this is still the case even when the maximum of the amplitude $A_M(f)$ of the measurement signal is distinctly reduced by attenuation or a reduction in the oscillation quality.

For the ideal case, where the two additional signals compensate one another exactly, $A^*$ has the value zero and the amplitude $A(f)$ of the reception signal E is identical to the amplitude $A_M(f)$ of the measurement signal.

In principle, the phase $\Delta\phi(f)$ of the reception signal has the same profile as a function of the frequency as in the example of FIG. 6b. The antiresonant frequency $f_{ar}$ at which the first sudden phase change occurs, is considerably lower in the case illustrated in FIG. 7b than in the case illustrated in FIG. 6b. The frequency range in which the phase $\Delta\phi(f)$ has the value 0° is correspondingly wider. The value of the frequency at which the second sudden phase change occurs is identical in both figures and corresponds to the resonant frequency $f_r$.

The dashed line indicates the profile of the phase $\Delta\phi(f)$ for the case where attenuation or a reduction in the oscillation quality is present. According to this, although the phase difference between the electrical transmission signal and the electrical reception signal E as a function of the frequency has no sudden phase changes, it does have two continuous phase changes in opposite directions to one another. Although the maximum phase difference may be less than 180°, a maximum phase difference of at least 90° is still ensured even in the event of very great attenuation or reduction in the oscillation quality of the system.

For the ideal case where the two additional signals compensate for one another exactly, in other words $A^*$ assumes the value zero, it is true in this case, too, that the phase $\Delta\phi(f)$ of the reception signal E is identical to the phase $\Delta\phi_M(f)$ of the measurement signal.

Irrespective of its oscillation quality, the reception signal E of an apparatus according to the invention always has the same fixed phase difference $\Delta\phi_R$ at the resonant frequency of the mechanical oscillatory structure.

What is claimed is:

1. An apparatus for establishing and/or monitoring a predetermined filling level in a container, which apparatus comprises:

a mechanical oscillatory structure (1), which is fitted at the level of the predetermined filling level, an electromechanical transducer (2),
which has at least one transmitter (23),
to which an electrical transmission signal is applied and
which excites the mechanical oscillatory structure (1) to produce oscillations, and
which has a receiver (24),
which picks up the mechanical oscillations of the oscillating structure (1) and converts them into an electrical reception signal (E), an evaluation unit (9),
which picks up the reception signal (E) and determines its frequency, compares said frequency with a reference frequency ($f_R$) and generates an output signal which indicates that the mechanical oscillatory structure (1) is covered by a charge material if the frequency has a value which is less than the reference frequency ($f_R$), and that is not covered if the value is greater, and a control loop, which regulates a phase difference existing between the electrical transmission signal and the electrical reception signal (E) to a specific, constant value ($\Delta\phi_R$) at which the oscillatory structure (1) oscillates at a resonant frequency ($f_r$), wherein
a reception signal line (6), which transmits the reception signal (E), is connected via an electrical impedance (Z) to a transmission signal line (5), which transmits the transmission signal, the impedance being set to compensate for additional signals caused by mechanical and/or electrical coupling between the at least one transmitter and the receiver.

2. The apparatus as claimed in claim 1, in which the reception signal (E) has three components, namely
a measurement signal, which is governed by the oscillation of the mechanical oscillatory structure,
a first additional signal, which is governed by electrical coupling between the transmitter (23) and the receiver (24), and
a second additional signal, which is governed by mechanical coupling between the transmitter (23) and the receiver (24), and
in which the impedance (Z) is determined in such a way that the first and the second additional signals have virtually identical amplitudes ($A_{el}$, $A_{mech}$), and have a profile which is virtually in antiphase.

3. The apparatus as claimed in claim 1, in which the transmitters (23) and the receiver (24) are piezoelectric elements.

4. The apparatus as claimed in claim 1, in which the phase difference between the transmission signal and the reception signal (E) assumes values between 20° and 90° or between −90° and −20°, referring to a reference value.

5. The apparatus as claimed in claim 1, in which the impedance (Z) is a capacitance.

6. The apparatus as claimed in claim 1, in which the impedance (Z) is a resistance, an inductance or a combination of at least one resistance and/or at least one inductance and/or at least one capacitance.

* * * * *